United States Patent [19]

Fujiyama et al.

[11] Patent Number: 4,537,046
[45] Date of Patent: Aug. 27, 1985

[54] SEMI-CLOSED TYPE REFRIGERANT COMPRESSING MACHINE

[75] Inventors: Shigeo Fujiyama; Yasuhiro Ogata, both of Nagasaki, Japan

[73] Assignee: Mitsubishi Denki Kabushiki Kaisha, Tokyo, Japan

[21] Appl. No.: 625,894

[22] Filed: Jun. 29, 1984

[30] Foreign Application Priority Data

Jul. 1, 1983 [JP] Japan .............................. 58-120612

[51] Int. Cl.³ .............................................. F25B 31/00
[52] U.S. Cl. ........................................ 62/505; 310/62; 310/211; 417/368; 417/371
[58] Field of Search .................. 62/505; 417/368, 371; 310/61, 62, 211

[56] References Cited

U.S. PATENT DOCUMENTS 3,778,652 12/1973 Endress ............................... 310/211

FOREIGN PATENT DOCUMENTS 5023895 7/1967 Japan .

Primary Examiner—Ronald C. Capossela
Attorney, Agent, or Firm—Oblon, Fisher, Spivak, McClelland & Maier

[57] ABSTRACT

A refrigerant compressing machine comprises a motor having a rotor and a stator, a compressor driven by the motor to compress a refrigerant, a casing for hermetically receiving therein the motor and the compressor wherein the refrigerant is passed from a refrigerant gas intake port through a refrigerant gas passage formed in the motor in its axial direction toward the compressor to thereby cool the motor. A stirring means is provided, separate from elements which form the refrigerant gas passage, at the outlet side of a motor chamber to stir the refrigerant flowing through the refrigerant gas passage.

4 Claims, 4 Drawing Figures

SEMI-CLOSED TYPE REFRIGERANT COMPRESSING MACHINE

BACKGROUND OF THE INVENTION

Field of the Invention

The present invention relates to a semi-closed type refrigerant compressing machine. More particularly, it relates to an improvement in a motor installed in such machine.

For a refrigerant compressing machine used for a cooling apparatus, a refrigerator and so on, a semi-closed type one which hermetically receives a motor and a compressor in a casing has been used to increase air-tight property for a refrigerant gas.

An example of the conventional semi-closed type refrigerant compressing machine is shown in FIGS. 1 and 2. In the Figures, reference numerals 1a and 1b respectively designate the inlet side and the outlet side of a chamber for a motor which comprises a stator 2, a winding 3 wound on the stator 2 and a rotor 4, the stator and the rotor being formed by aluminum die-casting. A reference numeral 5 designates vanes formed in one side surface of the rotor so as to project in the radial direction. For the vanes, gates for forming the rotor by die-casting operation of a molten metallic material are utilized and they are remained without cutting in the finishing operation. The rotor 4 is firmly secured to a shaft 6. The motor and the other structural components are hermetically sorrounded by a casing 7 which is provided with a refrigerant gas intake port 8. In the casing 7, a refrigerant gas passage 9 is formed between the inner surface of the casing 7 and the outer peripheral surface of the stator 2 and an air gap 10 is formed between the stator 2 and the rotor 4.

In the conventional compressing machine having the construction as above-mentioned, when a compressor (not shown) is driven by the shaft 6 as an output shaft of the motor, the refrigerant gas flows into the inlet side 1a of the chamber for the motor through the intake port 8 and is passed through the passage 9 and the air gap 10 in the motor to be discharged through the outlet side 1b for the motor chamber whereby the motor is cooled by the refrigerant gas. In this case, since the refrigerant gas stirred by the vanes formed integrally with the rotor 4, the stator winding 3 neighboring the vanes is cooled. As a result, the temperature of the refrigerant gas increases from the inlet side of the motor chamber to the outlet side thereof and accordingly the temperature of the stator winding indicates the same tendency. Namely, the vanes 5 attached to the rotor 4 do not effectively contribute the cooling of the stator winding and the highest temperature portion of the stator winding tends to be located at the outlet side of the motor chamber.

SUMMARY OF THE INVENTION

It is an object of the present invention to eliminate the disadvantage of the conventional device and to provide a semi-closed type refrigerant compressing machine for providing a uniform temperature distribution of a stator winding.

The foregoing and the other objects of the present invention have been attained by a refrigerant compressing machine comprising a motor having a rotor and a stator, a compressor driven by the motor to compress a refrigerant, a casing for hermetically receiving therein the motor and the compressor, the refrigerant being passed from a refrigerant gas intake port through a refrigerant gas passage formed in the motor in its axial direction toward the compressor to thereby cool said motor, characterized in that a stirring means is provided, separate from elements which form the refrigerant gas passage, at the outlet side of a motor chamber to stir the refrigerant flowing through the refrigerant gas passage.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

An embodiment of the present invention will be described with reference to FIG. 3.

Figure 1:
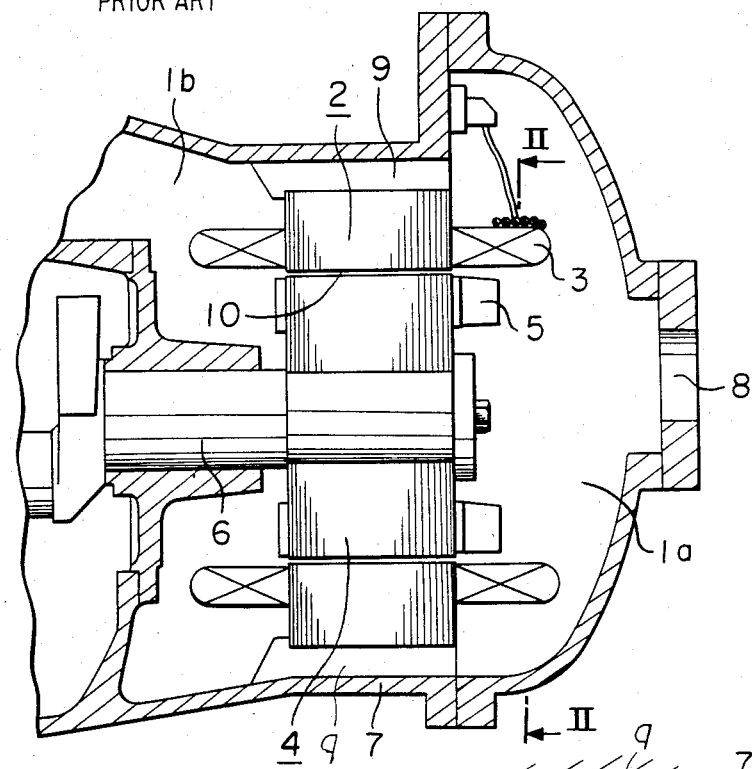
FIG. 1 is an important part of a conventional semi-closed type refrigerant compressing machine.
Figure 2:
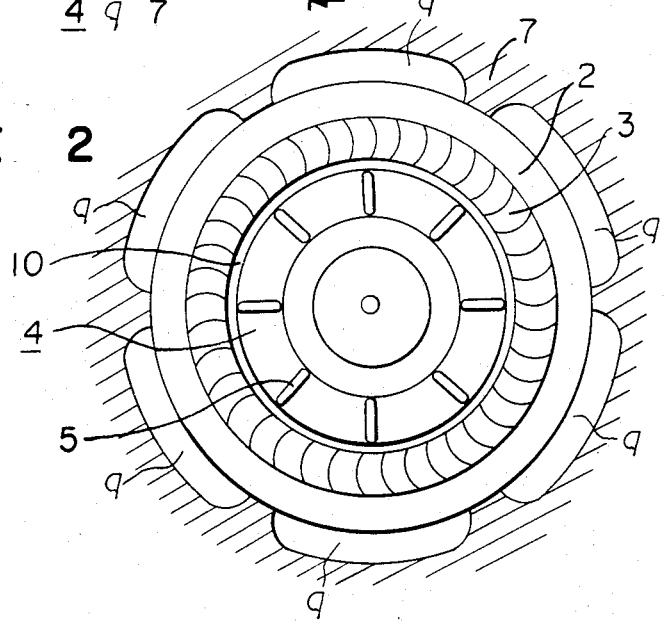
FIG. 2 is a cross-sectional view taken along the line II—II in FIG. 1.
Figure 3:
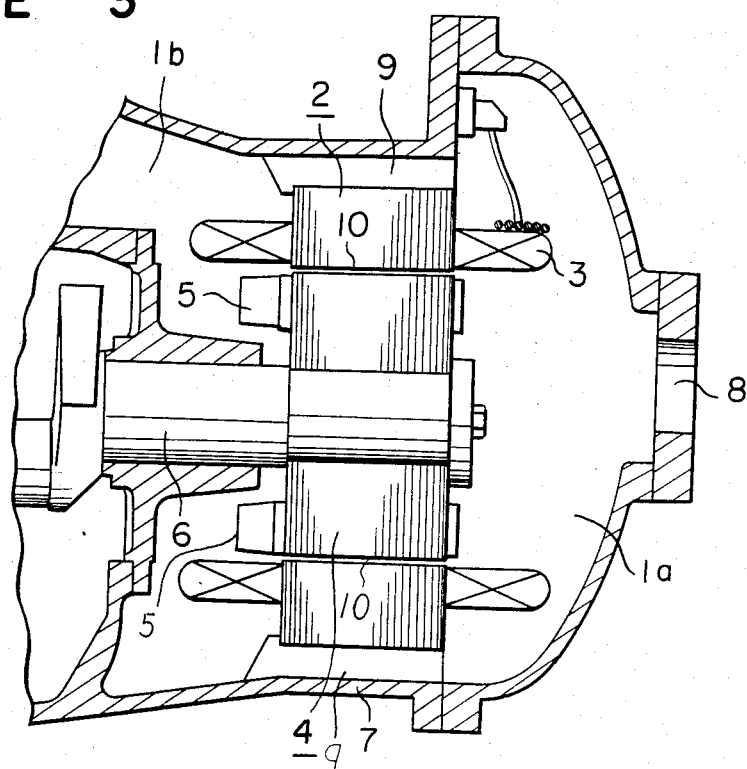
FIG. 3 is a sectional view of an important part of an embodiment of the semi-closed type refrigerant compressing machine according to the present invention.

In FIG. 3, the same reference numerals designate the same or corresponding parts. The rotor 4 of the present invention is the same as that of the conventional machine as shown in FIG. 1 provided that the direction of the rotor 4 is inverted when it is assembled. That is, the vanes 5 as the gates used for production of the rotor 4 by die-casting are formed in the rotor 4 at the side of the compressor, namely at the side of discharging the refrigerant gas for cooling the motor.

With the construction as above-mentioned, the vanes 5 stir the refrigerant gas at the discharging side of the refrigerant gas although the passages for the refrigerant gas in the motor are the same as the conventional apparatus. As a result, the temperature of the stator winding at the outlet side of the motor chamber remarkably decreases.

Figure 4:
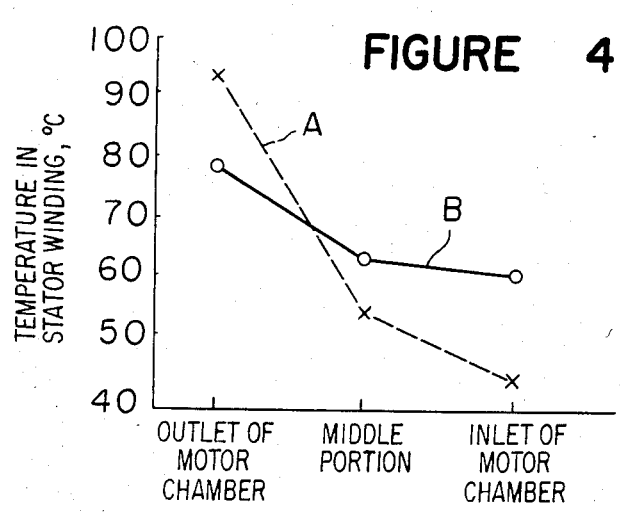
FIG. 4 is a characteristic diagram showing temperature distribution of a stator winding.

FIG. 4 is a graph showing measurement of temperature for the stator winding of a semi-closed type refrigerant compressing machine having an output capacity of 30 KW. The conventional machine in which vanes are provided at the inlet side of the motor chamber indicates temperature distribution as shown by the dotted line A whereas the machine according to the present invention indicates temperature distribution as shown by the solid line B. It is apparent from the FIG. 4 that the temperature of the stator winding at the outlet side of the motor chamber is lower than the conventional machine by about 15° C. On the other hand, although the temperature of the winding at the inlet side of the motor chamber more or less increases in comparison with the conventional machine, it does not cause any problem because the temperature level in the conventional machine is unnecessarily low.

In the embodiment as above-mentioned, the gates for producing the rotor by aluminum die-casting are utilized as the vanes. It is possible to separately prepare and attach the vanes to increase cooling efficiency to the stator winding.

As described above, the semi-closed type refrigerant compressing machine of the present invention is so constructed that vanes are provided on a side surface of a rotor at the outlet side of a motor chamber where the temperature of a stator winding tends to increase whereby temperature distribution in the winding can be uniform by reduction in the highest temperature portion to improve the reliability and expand it usage.

Obviously, numerous modifications and variations of the present invention are possible in light of the above teachings. It is therefore to be understood that within the scope of the appended claims, the invention may be practiced otherwise than as specifically described herein.

What is claimed is:

1. A semi-closed type refrigerant compressing machine comprising:
   (a) a casing provided with a refrigerant gas intake port;
   (b) a compressor shaft mounted in said casing and projecting towards said refrigerant gas intake port;
   (c) a rotor mounted on said compressor shaft;
   (d) a stator bearing a stator winding mounted in said casing and surrounding said rotor so as to leave an air gap therebetween, said rotor and said stator being mounted between the inlet side and the outlet side of a motor chamber, the inlet side of said motor chamber being in fluid communication with said refrigerant gas intake port; and
   (e) a plurality of refrigerant gas passages leading from the inlet side of the motor chamber to the outlet side of the motor chamber radially outwardly of said stator,
   (f) said rotor having a plurality of vanes formed on the outlet side thereof to direct refrigerant gas over the stator winding on the outlet side of said stator but no vanes formed on the inlet side thereof to direct refrigerant gas over the stator winding on the inlet side of said stator, whereby the temperature on said outlet side is lowered by said vanes without unnecessarily lowering the temperature on said inlet side.

2. A semi-closed type refrigerant compressing machine as recited in claim 1 wherein said vanes are formed integrally with said rotor by die-casting.

3. A semi-closed type refrigerant compressing machine as recited in claim 1 wherein said vanes are formed separately from said rotor and are attached thereto.

4. A semi-closed type refrigerant compressing machine as recited in claim 1 wherein:
   (a) said rotor is an aluminum die-cast rotor and
   (b) said stator is an aluminum die-cast stator.

* * * * *